(12) United States Patent
Kaufman

(10) Patent No.: US 7,062,457 B1
(45) Date of Patent: Jun. 13, 2006

(54) METHOD AND SYSTEM FOR ENTERTAINMENT PRODUCTION FINANCING

(75) Inventor: Victor Kaufman, Sands Point, NY (US)

(73) Assignee: IAC/Interactivecorp., New York, NY (US)

( * ) Notice: Subject to any disclaimer, the term of this patent is extended or adjusted under 35 U.S.C. 154(b) by 823 days.

(21) Appl. No.: 09/668,721

(22) Filed: Sep. 22, 2000

(51) Int. Cl.
 *G06F 17/60* (2006.01)
(52) U.S. Cl. ............................. 705/35; 705/36; 705/37
(58) Field of Classification Search .................. 705/35, 705/36, 37
See application file for complete search history.

(56) References Cited

U.S. PATENT DOCUMENTS

| | | | |
|---|---|---|---|
| 4,739,478 A | 4/1988 | Roberts et al. | 364/408 |
| 5,689,650 A | 11/1997 | McClelland et al. | 395/236 |
| 5,748,848 A | 5/1998 | Tresp | 395/23 |
| 5,826,241 A | 10/1998 | Stein et al. | 705/26 |
| 5,950,176 A * | 9/1999 | Keiser et al. | 705/37 |
| 5,963,924 A | 10/1999 | Williams et al. | 705/40 |
| 6,009,411 A | 12/1999 | Kepecs | 705/14 |
| 6,081,835 A | 6/2000 | Antcliff et al. | 709/217 |
| 6,240,415 B1 | 5/2001 | Blumberg | 707/9 |
| 6,792,411 B1 | 9/2004 | Massey, Jr. | |

FOREIGN PATENT DOCUMENTS

WO    WO 01/41437    6/2001

OTHER PUBLICATIONS

Hollywood Stock Exchange, (www.hsx.com).*
Grosz, P.J., "Financing Film Productions: Collateral and Risk: Financing Motion Pictures is not as risky as it is often presumed to be" American Banker (Aug. 3, 1984), p. 4.*
Collier, A., and Steuer, J., "October Secures $100 Mill 4-year operating loan" Hollywood Reporter, (Nov. 11, 1997), vol. 350, No. 2 pp. 3+.*
Movieshares.com webpages (www.movieshares.com/index. Shtml) 13 pages dated Jun. 7, 2000.

(Continued)

*Primary Examiner*—Vincent Millin
*Assistant Examiner*—Daniel Felten
(74) *Attorney, Agent, or Firm*—Greenberg Traurig (57) ABSTRACT

A system for purchasing from an intermediary a right to a payment related to the performance of an entertainment production. The system comprises a transaction server for generating web page data for a web page that displays information concerning one or more entertainment productions, and an offer to purchase one or more related participation units. The transaction server is adapted to transmit and receive such web page data via the Internet. A plurality of client information appliances, each adapted to receive via the Internet such web page data, and generate and display a web page based on such data, and further adapted to transmit information to the transaction server via the Internet, including acceptance of an offer to purchase a participation unit.

4 Claims, 6 Drawing Sheets

OTHER PUBLICATIONS

"The Plain Dealer", Film Invenstments can be more Glitz THan Substance. Oct. 5, 1998 (2 pgs).

"Successful Farming", Mar. 1998 (1 pg)-Feeder Pig Factories p H10.

"Barbers Dividends Looking Good", St. Paul Pioneer Dispatch Jan. 11, 1992, Business Section p. 7C (1 pg).

Invenstor Financing of Independant Film by Cones, et al Copyright 1998-Chapter 11 (Internet Film Offering) (pp. 203-205).

Viewers Choice Canada (1992). The Harold Greenberg Fund's Equity Investment Program created in 1992 (11 pgs).

US News & World Report-v119/v20-Nov. 1995 "Glory to the Mora Orles"-Weiss Leonard.

Canadian Business v60 p 88-Mar. 1987, 1987 Fergunson, T Stone Institute—TV Shows & More.

Screen Finance NY p10 "Cromwell, Advertiser for Imators in King Lear" Feb. 20, 1997.

Merritt, G. "Film Production Complete Guide Interactive Work" Now Old TV Hits on the Net, 1999.

Interactive Work "Now Old TV Hits and on the Net".

Los Angeles Times "Ventura Country Business: Ventura Country Review; Ventura Studio Company Expanded on Its Multimedia Savvy", Dec. 15, 1998.

San Francisco Chronicle "High Tech Way to Pitch a Movie"-Dec. 28, 1998.

HollywoodNetwork.com "American Film Market"-Mar. 1997-Carrel, Wendy.

Filmmakers & Financing-Levinson-Barnes & Noble-Jan. 1998.

Millimeter Magazine-Mar. 3, 1994 "Interview of Magazine".

* cited by examiner

Other Amount: _____________ —554

Account Info: _____________ —560
Authorization#: _____________ —562

Enter amount of investment $ _____________
712

Enter box office receipts $ _____________
716

Calculate —718

METHOD AND SYSTEM FOR ENTERTAINMENT PRODUCTION FINANCING

BACKGROUND OF THE INVENTION

1. Field of the Invention

This invention relates to a method and system for entertainment production financing. More particularly, this invention relates to a method and system that simultaneously provides (1) the general public with an on-line investment opportunity to purchase securities whose return, if any, is based on the performance of entertainment productions distributed by major entertainment companies; (2) the general public with an on-line investment opportunity requiring only a very modest investment amount that is proportionate to the investor's financial capacity to absorb risk; and (3) major entertainment companies with the opportunity to secure significant amounts of guaranteed equity-based financing for a significant number of entertainment productions on a cost efficient basis through a system (described herein) involving a new source of equity capital from the general public which has not been available prior to this invention.

2. Related Art

The business of producing, distributing and exploiting entertainment productions, e.g., motion pictures, television and cable programming, music, videos, video games and digital entertainment programming ("Entertainment Productions") is subject to a high degree of risk. This is because the cost structure for producing Entertainment Productions is high and heavily front end-loaded, whereas the revenue structure for the distribution and other exploitation of Entertainment Productions is back-end loaded and speculative (since it is highly dependent on public tastes and attitudes which are unpredictable and which are subject to sudden change for a variety of reasons, including the availability of other competing Entertainment Productions and other types of entertainment).

The production, distribution and exploitation of Entertainment Productions requires the commitment of multimillion dollar expenditures based largely on a preproduction subjective evaluation of the commercial potential of a proposed project (typically determined years before the completion and distribution of the project). These production costs, as well as the costs of marketing and distributing Entertainment Productions, have increased significantly in recent years and at a rate faster than the general rate of increase in revenues generated from the distribution and other exploitation of Entertainment Productions. This is because of a multiplicity of factors beyond the control of producers of Entertainment Productions, including ever-increasing compensation demands of creative and artistic talent, scarcity of commercially viable intellectual properties, intense-competition among producers and distributors of all forms of entertainment products, the increasing number of entertainment products, and the increasing diversity of different types of entertainment, all vying for the leisure time spending of the consuming public.

As a result of these and other fluctuating, unpredictable and subjective factors, a significant percentage of Entertainment Productions annually produced and distributed by major entertainment companies (as well as smaller independent production companies) are unprofitable after taking into account the relevant production costs, distribution fees, distribution, marketing and promotional expenses, contingent compensation payable to creative and artistic talent, amounts payable under applicable union agreements and interest expenses.

In order to manage the risk inherent in the business of producing and distributing Entertainment Productions, and in particular, motion pictures, the major entertainment companies have resorted to a wide variety of risk mitigation strategies, principally the "Portfolio Strategy," and the "Risk Transfer Strategy." The "Portfolio Strategy" is based on historical performance of a large number of Entertainment Productions over a long period of time. This strategy assumes that there is a high degree of statistical probability that if a major entertainment company distributes a sufficient number of Entertainment Productions (i.e., a "Portfolio") on a continuous basis over a long enough period of time, the entertainment company will, on average over the long-term, derive enough aggregate profits generated by the proportionately fewer of its profitable Entertainment Productions in its Portfolio to at least absorb the cumulative losses generated by the proportionately greater number of unprofitable Entertainment Productions in its Portfolio.

Because the Portfolio Strategy mitigates, but does not transfer, risk, the major entertainment companies have consistently sought to finance a portion of the production cost of their Entertainment Productions (principally motion pictures) on a risk-sharing basis through a wide-variety of financing transactions. These transactions, referred to as "Risk Transfer Strategy Transactions," are designed to shift economic risk of loss of one or more Entertainment Productions to investors in exchange for a share of the potential economic benefit generated by the commercial success of the particular Entertainment Productions financed.

Historically, and because of practical market considerations and cost and other constraints on the ability of equity arrangers to efficiently and economically access and aggregate capital for the financing of Entertainment Productions to the general public, the opportunity to invest in these Risk Transfer Strategy Transactions has been limited to strategic and institutional investors and high net worth individuals. Risk Transfer Strategy Transactions have been unavailable to the general public for investments in small amounts. Moreover, only a small portion of the general public, meeting certain financial standards, have been able to invest in Portfolio Strategy Transactions, which still required minimum investments of several thousand dollars and a payment period of several years to realize a potential return of the investment.

Thus, to date, major entertainment companies have been deprived of the ability to utilize modest investments made by large numbers of the general public as a source to provide financing to fund the cost of Entertainment Productions. Likewise, the general public has been deprived of the opportunity to invest very modest amounts in securities which would pay returns based on the performance of one or more Entertainment Productions produced and distributed by major entertainment companies and also on an economic basis proportionate to the investors' financial capacity to absorb risk.

SUMMARY OF THE INVENTION

The present invention provides for a system pursuant to which, on a guaranteed long-term commitment basis, a group of two or more major entertainment companies ("Participating Entertainment Companies") will create and sell separate contractual interests ("Contractual Interests") relating to a large number of Entertainment Productions produced and distributed by such Participating Entertainment Companies—each providing for a contractual indexed return based on the performance of the underlying Entertainment Production—to a third party entity (the "Financing Entity"). The Financing Entity, in turn, preferably will create and sell separate mirror contractual interests ("Mirror Contractual Interests")—each preferably mirroring the payout terms of a Contractual Interest purchased by the Financing Entity from a Participating Entertainment Company—to another entity, such as an affiliate of the Financing Entity (the "Operating Entity") which will "securitize" these Mirror Contractual Interests (as described below). In an alternative embodiment, the Financing Entity will directly "securitize" Contractual Interests in the same manner.

In the preferred embodiment, the Operating Entity will create securities based on the Mirror Contractual Interests in the form of "Participation Trust Units" (as defined below). These Participation Trust Units will be sold in small denominations (e.g., $50–$100 per Participation Trust Unit) to the general public utilizing data processing equipment and a communications network, preferably the Internet. In the preferred embodiment, sales of Participation Trust Units will be made through a website (the "Affiliated Website"), operated by or on behalf of the Operating Entity, and optionally through other authorized websites. In the alternative embodiment, the Financing Entity will create securities based on Contractual Interests in the form of Participation Trust Units, which will be sold in the same manner.

Each Contractual Interest for each Entertainment Production will provide for the Participating Entertainment Company to receive a fixed cash payment (preferably a fixed percentage of the production cost of such Entertainment Production) from the Financing Entity and to pay a contingent amount determined pursuant to a payout schedule (the "Payout Schedule") based upon the relationship between the production cost of a particular Entertainment Production and a specified performance index. In the case of an Entertainment Production which is a motion picture, the Contractual Interest will provide for the Participating Entertainment Company that distributes the motion picture to pay an amount (the "Payout Amount") preferably determined by reference to the relationship between the production cost of such motion picture and the cumulative total U.S. and Canadian "Box Office Gross Receipts" generated by such motion picture (i.e., the performance index for motion pictures) as set forth in the Payout Schedule. The Payout terms of the Contractual Interest between each Participating Entertainment Company and the Financing Entity, and the corresponding Mirror Contractual Interest between the Financing Entity and the Operating Entity, preferably will be identical.

All other material terms of each Contractual Interest and each corresponding Mirror Contractual Interest preferably will also be identical except that the Financing Entity will only receive the purchase price of the Mirror Contractual Interest from the Operating Entity to the extent that proceeds from the sale of Participation Trust Units relating to such Mirror Contractual Interests are sufficient to pay such purchase price—i.e., the Financing Entity (not the Operating Entity) will bear the risk that sales of Participation Trust Units will not generate sufficient proceeds to recoup the amounts paid by the Financing Entity to the Participating Entertainment Companies for Contractual Interests.

In the preferred embodiment, the Operating Entity will establish a business trust or other arrangement (a "Participation Trust") to hold each Mirror Contractual Interest that the Operating Entity purchases from the Financing Entity and will thereupon sell Participation Trust Units in such Participation Trust to members of the general public as noted above. In an alternative embodiment, the Financing Entity will establish a Participation Trust for each Contractual Interest that the Financing Entity purchases from each Participating Entertainment Company and will thereupon sell Participation Trust Units in each such Participation Trust to members of the general public in the same manner. In this disclosure, the term "Participation Trust Unit" means an interest in an individual Participation Trust entitling the holder thereof to a proportionate share (based on the ratio of the number of units in such Participation Trust owned by such holder to the total number of units in such Participation Trust outstanding) of the proceeds received by the Participation Trust on account of the Mirror Contractual Interest held (or Contractual Interest, as applicable) by such Participation Trust.

In the preferred embodiment, the Operating Entity preferably will be obligated to pay an amount equal to the proceeds of the sale of Participation Trust Units in a particular Participating Trust to the Financing Entity on account of the purchase price of the Mirror Contractual Interest held by such Participation Trust; and, correspondingly, the Financing Entity preferably will be obligated to pay to the Operating Entity (which, in turn, preferably will be obligated to pay to the applicable Participating Trust) an amount equal to the Payout Amount payable by the Participating Entertainment Company to the Financing Entity with respect to the Entertainment Production to which the Mirror Contractual Interest relates.

In an alternative embodiment, the Financing Entity preferably will retain the proceeds from the sale of Participation Trust Units to recoup the Purchase Price of Contractual Interests; and, correspondingly, the Participating Entertainment Company preferably will be obligated to pay to the Financing Entity (which, in turn, preferably will be obligated to pay to the applicable Participation Trust) an amount equal to the Payout Amount payable by the Participating Entertainment Company on account of Contractual Interests.

The Financing Entity preferably will conduct its business pursuant to a financial plan that allows for the Financing Entity to borrow from financial institutions, and obtain equity, to fund the cost of Contractual Interests. This allows the Financing Entity and the Entertainment Companies to enter into long-term agreements covering a substantial number of Contractual Interests relating to a substantial number of Entertainment Productions over a significant period of time (i.e., several years). As a result, the Financing Entity is able to create and sell Mirror Contractual Interests to the Operating Entity; and the Operating Entity is then able to create and sell to the general public, utilizing data processing equipment and a communications network, preferably the Internet, Participation Trust Units covering Mirror Contractual Interests.

The ability to sell Participation Trust Units over the Internet will also drive traffic to the Affiliated Website (and optionally other authorized websites). This will allow the Operating Entity to access a potentially large investor base on an on-going cost efficient basis in order to sell Participation Trust Units (and thus raise capital to defray the cost of Mirror Contractual Interests and, correlatively, Contractual Interests) and to also offer commerce and promotional opportunities associated with the Entertainment Productions, as well as other entertainment products of the Participating Entertainment Companies and other companies, and to offer the opportunity for companies to advertise on the Affiliated Website (and optionally other authorized websites).

DETAILED DESCRIPTION OF THE PREFERRED EMBODIMENTS

1. Introduction

The present invention applies to the financing of all forms of Entertainment Productions, including motion pictures, television and cable programming, music, videos, video games, and all forms of digital programming. For illustrative purposes, and not by way of limitation, this detailed description of the preferred embodiments at times shall refer to Entertainment Productions that are theatrical motion pictures distributed by "Major Studios".

2. Principal Financial Elements

There are four general, principal financial elements that underlie the present invention and that, in the view of the inventors, have not heretofore been combined in the manner of the preferred embodiments to create a method and system for financing Entertainment Productions.

These four financial elements are as follows.

a. First, the commitment (a "Sale Commitment") by each Participating Entertainment Company (preferably a Major Studio in the United States) to enter into a long-term (preferably several years) output agreement (an "Output Agreement") with the Financing Entity pursuant to which the Participating Entertainment Company will be obligated to sell to the Financing Entity Contractual Interests covering all or most motion pictures theatrically distributed by the Participating Entertainment Company in the U.S. during the term of the Output Agreement ("Output Films") which satisfy certain eligibility criteria. The eligibility criteria preferably will include production cost, theatrical release and distribution rights criteria.

b. Second, the Financing Entity's commitment (the "Purchase Commitment") pursuant to the Output Agreement with each Participating Entertainment Company to purchase Contractual Interests covering all Output Films of such Participating Entertainment Company at a price for each Contractual Interest preferably equal to a fixed percentage of the production cost (as defined) of each Output Film underlying each Contractual Interest. Each Contractual Interest for each Output Film represents the obligation of a Participating Entertainment Company to pay to the Financing Entity an amount ("Participation Payout") determined pursuant to a Payout Schedule which, as indicated above, preferably is based upon the relationship between the production cost of the Output Film with respect to a particular Contractual Interest and a performance index (preferably the amount of Box Office Gross Receipts generated by such Output Films in the U.S. and Canadian theatrical markets).

The final form of Payout Schedule preferably will be uniform for all Contractual Interests of all Participating Entertainment Companies and will be determined through negotiations between the Participating Entertainment Companies, the Financing Entity and the Financing Entity's lenders.

Neither the Financing Entity nor any other holder of any Contractual Interest will have any copyright or ownership interest, or other property right, in any Output Film underlying the Contractual Interest.

c. Third, based on a financing plan devised by the Financing Entity, the commitment (the "Equity Commitment") by equity investors (preferably including each of the Participating Entertainment Companies) to provide equity capital to the Financing Entity in an aggregate amount which, when combined with very significant debt financing, will enable the Financing Entity to finance the purchase of Contractual Interests pursuant to the Output Agreements with each of the Participating Entertainment Companies.

d. Fourth, based on a financing plan devised by the Financing Entity, the commitment (the "Loan Commitment") by one or more lenders (the "Lenders") to provide very significant debt financing to the Financing Entity in an aggregate amount which, when combined with equity capital as described above, will enable the Financing Entity to finance the purchase of Contractual Interests pursuant to the Output Agreements with each of the Participating Entertainment Companies.

The Loan Commitment and the Equity Commitment are preferable for obtaining the Purchase Commitment and the Sale Commitment. The Purchase Commitment and the Sale Commitment likewise are preferable for obtaining the Loan Commitment and the Equity Commitment. These commitments, in turn, provide the basis for the securitization of Participation Trusts by the Operating Entity in the preferred embodiment or the Financing Entity in an alternative embodiment.

3. Securitization of Participation Trusts

A Participation Trust will be established for each Contractual Interest and Participation Trust Units will be sold, preferably in $50–$100 denominations, to members of the public, preferably over the Internet through the Affiliated Website (and optionally other authorized websites). The purchase price of individual Participation Trust Units can be made payable by credit card or optionally through an account established with the Affiliated Website. The Operating Entity (or the Financing Entity, as applicable) will "securitize" each Participation Trust in a manner designed to comply with Federal and State securities laws.

In the case of sales of Participation Trust Units governed by United States securities laws, units in each Participation Trust will be registered with the Securities and Exchange Commission ("SEC") and otherwise qualified for sale under applicable State securities laws preferably pursuant to a master registration statement process to be negotiated with the SEC (and State Blue Sky authorities) under which an "evergreen" master registration statement (setting forth the overall Participation Trust structure and general terms and conditions of the offering, including all general risk factors and disclosures) would be filed and maintained on a current basis with the SEC (and applicable State Blue Sky authorities) and would be supplemented for each Participation Trust. A prospectus for the offering of units in each Participation Trust would be delivered to each investor, preferably on-line over the Internet through the Affiliated Website.

4. Nature of Participation Trust Units

Each holder of Participation Trust Units ("Holder") will have a contractual right to receive a proportionate share (based on the ratio that the number of Participation Trust Units owned by such Holder in the applicable Participation Trust bears to the total number of Participation Trust Units issued by such applicable Participation Trust) of the Participation Payout received by the applicable Participation Trust on account of the applicable Mirror Contractual Interest (or Contractual Interest, as applicable), less certain fees and expenses.

The Holder of any Participation Trust Units, the Operating Entity and the Financing Entity will not have any copyright or ownership interest, or other property right, in any Output Film that is related to any Participation Trust, Mirror Contractual Interest or Contractual Interest.

5. Sales and Marketing of Participation Trust Units

In the preferred embodiment, Participation Trust Units will be marketed and sold by the Operating Entity, preferably on-line over the Internet through the Affiliated Website (and optionally other authorized websites) for its own account. In an alternative embodiment, Participation Trust Units will be marketed and sold by the Financing Entity in the same manner. As noted above, the Financing Entity will bear the risk that the sale of a number of Units in any Participation Trust may not generate proceeds sufficient to enable the Financing Entity to recoup the amount paid to the Entertainment Company for the Contractual Interest that relates to the Mirror Contractual Interest (or Contractual Interest, as applicable) held by the Participation Trust (a "Shortfall"). To enable the Financing Entity to manage the risk of and minimize Shortfalls for, the entity (the "Selling Entity") that sells Participation Trust Units (i.e., preferably the Operating Entity or, alternatively, the Financing Entity) will have the right (1) to determine the price of Participation Trust Units (which may include a margin over the cost of the related Contractual Interest), (2) to sell Participation Trust Units in packages (as described below) and (3) to create a "spread" on Participation Payouts on the better-performing Participation Trusts.

6. Packaging of Participation Trust Units

In order to manage the risk of inventory losses, the Selling Entity preferably will, from time to time as needed, "package" Participation Trust Units relating to two or more underlying Output Films—i.e., couple for sale two or more separate Participation Trust Units relating to separate underlying Output Films—in order to balance to the maximum extent feasible its total inventory of unsold Participation Trust Units (i.e., to insure to the maximum extent feasible that the ratio of sold Participation Trust Units relating to each underlying Output Film to the unsold Participation Trust Units with respect to the same underlying Output Film remains constant). Composition of the packages of Participation Trust Units can be determined by the Selling Entity and optionally can vary on a daily, hourly or other periodic basis as necessary.

7. Pricing of Participation Trust Units

The price of each Participation Trust Unit (or Package of Participation Trust Units) preferably will be determined by the Selling Entity to enable the Selling Entity to sell the maximum amount of Participation Trust Units, which in turn will allow the Selling Entity to pay the maximum amount on account of the purchase price of Contractual Interests and corresponding Mirror Contractual Interests. This in turn, will allow the Financing Entity to utilize, to the maximum extent possible, the equity generated from the sale of Participation Trust Units to public investors (and, correlatively, utilize, to the least extent possible, its own resources) to defray the cost of Contractual Interests. The price of each Participation Trust Unit (or package of Participation Trust Units) can be posted on the Affiliated Website (and optionally other authorized websites) and optionally vary on a daily, hourly or other periodic basis depending upon market considerations.

8. Financing Objectives and Benefits

The cost and Payout Schedule for each Contractual Interest and each corresponding Mirror Contractual Interest preferably will be designed to achieve the following objectives:

(a) provide the Financing Entity with the ability to recoup, on a "portfolio basis," at least the aggregate cost of all Contractual Interests respectively, plus financing costs.

(b) provide public investors who purchase Participation Trust Units with meaningful "upside" investment opportunities with respect to Participation Trust Units relating to individual over-performing Output Films.

(c) provide each Participating Entertainment Company with meaningful "downside" risk transfer financing on individual under performing Output Films; and (d) provide each Participating Entertainment Company with "off-balance sheet" "portfolio-type" financing which:

(i) in a low case scenario (i.e., an under-performing portfolio of Output Films over a 5 year period), results, on an individual film basis, in risk transfer financing for under-performing Output Films and, on a "portfolio basis," in an overall financing cost to the Participating Entertainment Company somewhat lower than normal borrowing costs based on prevailing market rates for comparable financing;

(ii) in the base case scenario (i.e., an average performing "portfolio" of films over a 5 year period), results, on a "portfolio basis," in an overall financing cost to each Participating Entertainment Company that approximates normal borrowing costs based on prevailing market rates for comparable financing; and (iii) in the high case scenario (i.e., an over-performing portfolio of films over a 5 year period), results, on a portfolio basis, in an overall financing cost to each Participating Entertainment Company somewhat higher than normal borrowing costs based on prevailing market rates for comparable financing.

9. Payment Schedule and Payouts

The payment schedule for each Participation Trust Unit (or package of Participation Trust Units) is preferably posted on the Affiliated Website (or optionally other authorized websites) and will enable each prospective purchaser of each Participation Trust Unit (or package of Participation Trust Units) to determine with specificity prior to the time of purchase the exact amount of return on investment such purchaser will realize at any given level of indexed performance (i.e., at any given level of total U.S. and Canadian box office receipts) achieved by the Output Film underlying any particular Participation Trust.

Each Participating Entertainment Company will preferably make the Participation Payout payment on each Contractual Interest sold to the Financing Entity on a date soon after the initial theatrical release date of the underlying Output Film. The Operating Entity (or, alternatively, Financing Entity) preferably will make correlative payments to each Participation Trust. In turn, correlative payments preferably will be made by each Participation Trust to each holder of Participation Trust Units in proportion to such holder's interest in such Participation Trust.

10. Accounting and Audit Rights

The accounting obligations of the Participating Entertainment Companies, and the audit rights of the Financing Entity, with respect to Contractual Interests are determined through negotiations between the Financing Entity and the Participating Entertainment Companies within customary motion picture industry parameters.

Holders of Participation Trust Units will not have the right to audit any of the Participating Entertainment Companies and none of the Participating Entertainment Companies will have any accounting obligations to any Holders of Participation Trust Units.

11. User Experience and Content

The user experience at the Affiliated Website (and optionally other authorized websites) will preferably provide access, excitement, opportunity and information. Preferably, visitors to the Affiliated Website (and optionally other authorized websites) will feel that they are accessing a unique and exclusive experience; that they are on the ground floor of movie projects and industry information; and that they can be active participants in a film financing experience. Unique information with respect to underlying Output Films preferably will be available and continuously updated in compliance with applicable securities laws, such as U.S. Federal and State securities laws. As information and underlying Output Films change, the Selling Entity will be able to change its packages and prices in relation to investor demand. Furthermore, individual investors will have the opportunity to pit themselves against other investors and to track their performance and skills. For example, there could be publicity for those "mini-moguls" interested in displaying their track record and investment acumen and success. There optionally will be opportunities to build content around investment successes, such as the "Mini-Mogul Hall of Fame," and sponsored trips to Hollywood. Premiere invitations and screening tickets to selected individuals can also be part of the Affiliated Website (or optionally other authorized websites) offerings, as can walk-on roles, studio passes and award show tickets. In general, Participating Entertainment Companies will be able to provide compelling and exclusive content early on in the development and production process of Output Films.

Visitors to Affiliated Websites (and optionally other authorized websites) interested in purchasing Participation Trust Units preferably will be presented with information that will help them to determine their decisions in compliance with applicable securities laws, such as U.S. Federal and State securities laws. Output Films optionally can be searched and selected by date, genre, actor, director, producer, or writer, to name just a few categories. Other searchable information optionally can include script synopses, talent attachments, anticipated principal photography dates, and anticipated release dates. To further build the suspense and excitement, Participation Trust Units preferably may only be made available during limited windows of time, strategically determined to maximize the perceived value of certain packages. Weekly box office performance of Output Films can be shown. Other information can include a library of old and new reviews, and historical box office data.

12. Exemplary System for Offering Participation Trust Units

Figure 1:
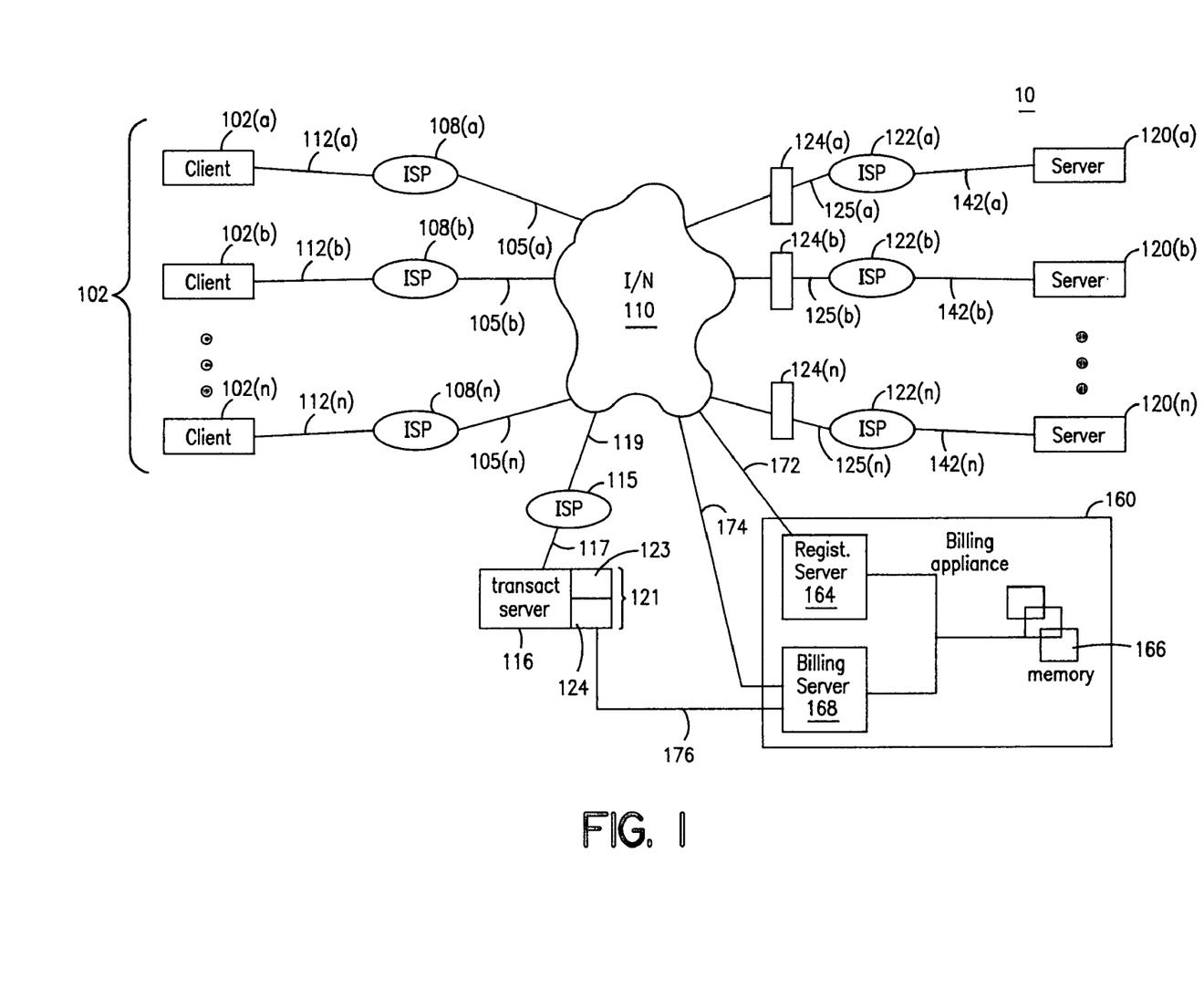
FIG. 1 is a schematic diagram of the overall architecture of an embodiment of the present invention.

FIG. 1 shows the overall architecture of a system 10 for delivering to the public offers to purchase Participation Trust Units, and for enabling the public to accept such offers. The system 10 includes data processing equipment, for example, transaction server 116, Participating Entertainment Company servers 120 and billing information appliance 160. The system 10 also includes network 110 and information appliances 102.

The individual client information appliances 102 are devices capable of communicating with a server, and include, for example, PC's, portable PC's with docking nodes, web TVs, cable system set top boxes, handheld personal digital assistants with wireless capability, conventional land-line and cellular phones (employing for example voice recognition equipment for converting spoken words to digital data), pagers, and the like. Information appliances 102 can access a service provider, such as an Internet service provider, either directly or via a network connection, which can be telephone, cable, or other wireless systems. In general, the teaching of this invention may be employed in conjunction with any suitable type of information appliance device 102 that is capable of communicating with other components of a communications network, and which includes one or more user interfaces for enabling a user to input information, view or otherwise perceive presented (e.g., displayed) information, and select or otherwise manipulate such presented information.

As described above, client information appliances 102(a) . . . 102(n) (where n may be any number) may be, for example, a commercially available general purpose computer such as a windows-type or MacIntosh-type computer, equipped with a desktop browser that enables the user to "surf the Net". Each client information appliance 102 has an associated communications link 112 to connect the client information appliance 102 with an associated service provider, such as an Internet Service Provider (ISP) 108, or an Internet Access Provider (IAP). Alternatively, a local area network (LAN), local exchange carrier (LEC), Digital Services Line (DSL) or Integrated Services Digital Network (ISDN) could be used. In FIG. 1, each client information appliance 102 is depicted as being connected to a unique ISP; plainly it is equally possible, and will often be the case, that several client information appliances are connected to the same ISP. Communication links 105 connect the ISPs 108 to the network 110. Each client information appliance 102, through its ISP, can transmit data to and receive data from the network 110, in ways that will be readily apparent to those skilled in the art.

Network 110 is any network of inter-connectable computers. In the present invention, network 110 preferably is the Internet with World-Wide-Web capabilities. The World-Wide-Web provides access to Internet information and services by using hypertext to organize, search and present information to a user.

Transaction server 116 is connected to the Internet 110 via Internet Service Provider 115 and communication links 117 and 119. The server 116 is for example, a computer or group of computers that facilitate the transmission, storage, and reception of information and other data between different points.

From a hardware standpoint, in this disclosure a server computer, such as server 116, will typically include one or more components, such as one or more microprocessors (also referred to as "controllers") (not shown), for performing the arithmetic and/or logical operations required for program execution. A server computer will also typically include disk storage media 123 (also referred to as a "memory"), such as one or more disk drives for program and data storage, and a random access memory, for temporary data and program instruction storage 127.

From a software standpoint, a server computer also contains server software (not shown) resident on the disk storage media, which, when executed, directs the server computer in performing its data transmission and reception functions. The server software runs on an operating system, for example Windows 2000 Advanced Server™ (Microsoft Corporation, Redmond Wash.), which is also stored on the disk storage media. Server computers are offered by a variety of hardware vendors, can run different operating systems, and can contain different types of server software, each type devoted to a different function, such as handling and managing data from a particular source, or transforming data from one format into another format.

The server 116 and the associated memory 123 and 127 collectively referred to as 121 stores various operating programs and routines for controlling server operations. One of the programs that could be stored in memory 121 is web server software, for example Microsoft Internet Information Server ("IIS") (or later versions thereof), running on a Windows platform.

Transaction server 116 contains a stored program that generates the data for the Affiliated Website (and optionally other authorized websites; these and the Affiliate Website are referred to generically as the "Website") and which, when displayed on client information appliances 102, permit the user to select Participation Trust Units to purchase. The Website data are delivered across the Internet 110 to users' browser programs. The transaction server 116 receives electronic information from client information appliances 102 regarding those Participation Trust Units which a user, using an associated client information appliance 102, wishes to purchase. A user, after viewing the Website, can select one or more of the Participation Trust Units described on the Website.

The Website has a portion that permits a user to make such purchases after acknowledging that they have read and understand related prospectus information. The purchases are preferably done by a user sending a credit card account number or bank account number, which preferably are encrypted prior to transmission, to the transaction server. Known encryption techniques, such as SSL (secure sockets layer), PGP (pretty good privacy) and Envelop98, can be used to ensure the security of the credit card or bank account information transmitted over the Internet 110.

Billing appliance 160 includes a billing registration server 164, billing server 168 and memory 166. Billing registration server 164 is connected to network (Internet) 110 via communication link 172. Communication link 176 connects the billing server 168 to transaction server 116. Communications link 174 connects the billing server 168 to Internet 110. The billing information appliance 160 can use information obtained by the transaction server 116 to generate billing information for users who have indicated that they would like to purchase a particular Participation Trust Unit.

Upon activation of an account, the billing server 168 preferably assigns and deposits a persistent mechanism in the browser program (shown in FIG. 2 as 118), elsewhere in client information appliance 102, and/or in server 116, such as a "cookie," which in turn transmits billing information back to the appliance 160 during the course of a transaction. Thus, when a user clicks (uses an input device to access a computer program function) on an icon of the Website, representing an intent to purchase a selected Participation Trust Unit, the information stored in the cookie file on the client information appliance 102 is transmitted to billing information appliance 160.

The above description is merely one illustrative embodiment of a billing method. As will be apparent to those skilled in the art, alternate billing arrangements could be used. For example browsers that have a "wallet" feature, such as Internet Explorer, Version 4.0X™ (Microsoft Corp. of Redmond, Wash.) may be used to facilitate payment over a network.

As another payment alternative, if the user does not wish to transmit credit card information over the Internet the payment system could use a secure transaction service provider (not shown) that has access to information of an ISP associated with a client information appliance. In this embodiment, the transaction service bills the ISP account the amount of purchases.

FIG. 1 also shows Participating Entertainment Company servers 120(*a*), 120(*b*) . . . 120(*n*)(where n may be any suitable number). Entertainment Company servers 120 are computers, similar to transaction server 116, discussed above, which include web pages that transmit information about a Participating Entertainment Company over network 110 to client information appliances 102. The transmitted information can include e-commerce opportunities, such as offers to purchase DVDs, movie tickets, videocassettes, CDs, licensed merchandise and other entertainment related products. The transmitted information can also include information related to future Participating Entertainment Company products, film clips, interviews with movie stars, as well as cross-links to other sites.

Internet Service Providers (ISPs) 122(*a*), 122(*b*) . . . 122(*n*) and communication links 142(*a*), 142(*b*) . . . 142(*n*) and 125(*a*), 125(*b*) . . . 125(*n*) provide access from the Internet 110 to associated Entertainment Company servers 120. Firewalls 124(*a*), 124(*b*) . . . 124(*n*) optionally provide security between the Internet 110 and Participating Entertainment Company servers 120.

Figure 2:
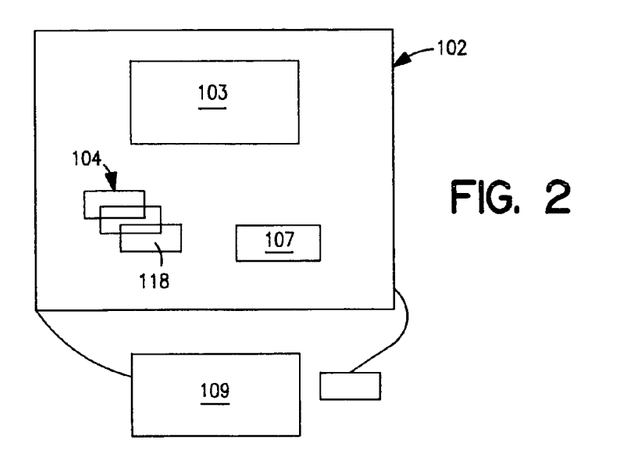
FIG. 2 shows the components of an embodiment of an information appliance of the present invention.

FIG. 2 shows the components of an embodiment of a client information appliance 102. These components include an output user-interface 103, a memory 104, a browser 118, a processor 107 and an input device 109.

Examples of suitable input devices 109 include a keyboard, a mouse, voice-input device, a trackball, touch screen, and/or any other suitable type of user-operable input device(s).

The output user-interface 103 may include, for example, a video display, a liquid crystal or other flat panel display, a speaker, a printer, and/or any other suitable type of output device for enabling a user to perceive outputted information.

The memory 104 may include any suitable storage device or storage devices, such as for example a hard drive, a zip drive, a CD-ROM drive, disk drive, etc., and will store an Internet browser 118, as well as other software programs commonly found on a personal computer (such as, for example, conventional operating systems and Internet browsers). Examples of suitable Internet browsers 118 include the Microsoft Internet Explorer™ browser and the Netscape™ browser. Other operating systems and Internet browsers are plainly possible as well.

The processor 107 might include any commercially available processors, such as the Intel Pentium line of processors, or the AMD Althon line of processors, currently equipped in IBM™ or IBM™-type personal computers, or the Motorola™ processors currently equipped in MacIntosh™ computers.

Figure 3:
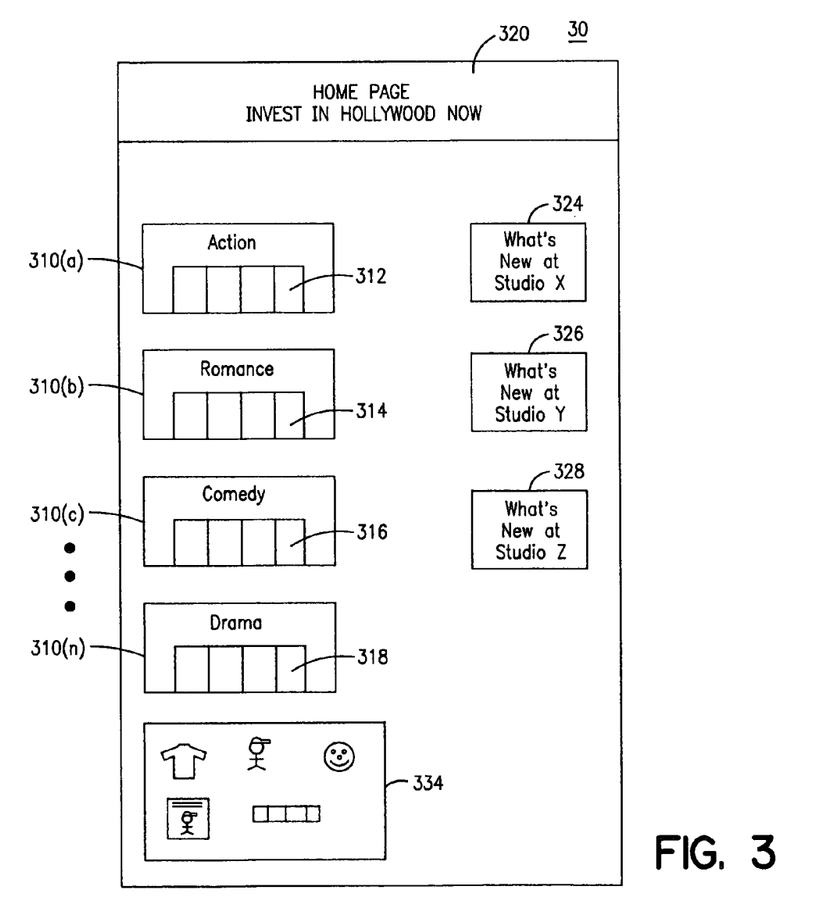
FIG. 3 shows web page content of an embodiment of the present invention.

FIG. 3 shows a web page 30 of the Affiliated Website used to inform users of opportunities to buy Participation. Trust Units. Web page 30 is generated on behalf of the Operating Entity. A similar web page can be generated by other authorized websites, if any.

As is well known, web pages provide a graphical interface for the display of information that optionally permits a user to access further information by suitable interaction with the graphical interface. For example, web pages can be combinations of text and tags using a coding system called Hypertext Markup Language (HTML), which are typically stored on network servers and then delivered across the networks to user's browser programs. The HTML tags serve a number of functions. Some mark portions of the text control how the user's browsers will format text before it is viewed. Other HTML tags represent pieces of additional content that is retrieved and brought to the browsers. This information can be compiled into web pages before a user views them.

Static elements, such as standard text may be stored directly as text in the HTML source text, while other elements, like images and music may all be stored in separate files on the same server or they may be stored at remote geographic locations on separate servers.

HTML tags can be used to bring pictures, movie or video content, sound content, text or any combination thereof to the web page 30.

Web page 30 of the Affiliated Website includes entertainment production information that relates to, for example, upcoming movie productions. The web page 30 is typically designed to display the information in a desired format. Web developers can use a computer program, such as Java™ to create dynamic, real-time web pages to display information received from partner studios. Java™ supports programming on the Internet in the form of platform-independent Java applets, which are small, specialized applications that comply with Sun Microsystems Java Application Programming Interface (API) allowing developers to add interactive content to web documents. Applets execute within a Java-compatible browser (e.g., Netscape Navigator™) by copying code from the server to the client information appliance.

Alternatively, products from Microsoft™ such as ActiveX™ enable developers and web designers to build dynamic content for a web site. For example, ActiveX Controls, which are small, fast components, enables developers to embed parts of software in hypertext markup language (HTML) pages. ActiveX Controls™ work with a variety of programing languages including Microsoft Visual C++, C#, Borland Delphi, Microsoft Visual Basic and future versions thereof.

Hypertext Transfer Protocol (HTTP) manages the interchange between browsers, which retrieve web page content, and the servers that provide web page content. HTTP permits following a Uniform Resource Locator (URL) address by the browser to an address on the server.

As one of ordinary skill in the art would readily recognize, any web page technology that provides a graphical interface for the display of information to a user, and, through the associated information appliance, either alone or through interaction with the web page display, the ability to communicate to a server, is suitable for use in this invention.

As shown in FIG. 3, web page 30 of the Affiliated Website includes heading information 320 which indicates that this is the web site homepage and invites users to purchase Participation Trust Units.

As explained above, a Participation Trust Unit provides a proportionate share of the proceeds received by the associated Participation Trust, which share preferably is related to the performance of an Entertainment Production. Web page 30 can offer one type of Participation Trust Unit, or preferably, a number of different Participation Trust Units, either offered individually or on a package basis. In this embodiment of FIG. 3, different Participation Trust Units by way of example are grouped into categories. Blocks 310(a) . . . 310(n) reflect HTML tagged portions of web page 30 that link to additional pages to permit a user to purchase Participation Trust Units relating to a particular category. Thus, in this example, the Participation Trust Units are grouped by genre (in this example, action, romance, comedy, drama), and thus for example, by clicking on link 310(a), transaction server 116 transmits to the user the data for a web page (not shown) that provides Participation Trust Units relating to action-themed Entertainment Productions. Alternatively, participation units can be grouped or displayed in any other desired manner.

The Entertainment Productions presented on the Website preferably are offerings of Participating Entertainment Companies, such as Major Studios, which, as explained above, have agreed to sell to the Financing Entity Contractual Interests relating to Entertainment Productions that satisfy certain eligibility criteria.

The Financing Entity preferably purchases the Contractual Interests from the Participating Entertainment Companies on pre-negotiated fixed terms. The purchase price for a Contractual Interest is preferably equal to a fixed percentage, for example 25%, of the production cost of the Output Film underlying the Contractual Interest.

The Selling Entity (either the Operating Entity or the Financing Entity, depending upon the embodiment) preferably will establish a Participation Trust and Participation Trust Units will be offered to the public over the Affiliated Website (and optionally over other authorized websites). As explained above, these Participation Trust Units may be offered alone, or packaged together with Participation Trust Units from other Participation Trusts. Optionally, in the event that an Entertainment Production underlying a Participation Trust Unit does not satisfy certain criteria, such as meeting the scheduled release date, the affected Participation Trust can be dissolved and Holders of the related Participation Trust Units can be refunded their purchase price.

The payout from a Participating Entertainment Company to the Financing Entity with respect to each purchased Contractual Interest is preferably related to the box office gross receipts of the underlying Entertainment Production. For example, a payout matrix that specifies a percentage based on the entertainment production's negative cost and domestic U.S. box office gross receipts (or U.S. and Canadian box office gross receipts) can be used to determine the payments to the Financing Entity.

In FIG. 3, links 312, 314, 316 and 318 of blocks 310 represent URL's to specific Participation Trust Units in each associated category, and enable a user to select specific Participation Trust Units. Links 324, 326 and 328 are links to specific web pages of Participating Entertainment Companies that enable a user to view images and data provided by the Participating Entertainment Companies from servers 120 (FIG. 1). Alternatively, or additionally, according to preference, links can be provided on web page 30 to offerings of "packages" of Participation Trust Units, as explained above.

Area 334 in FIG. 3 is an optional link that links to promotional merchandise for sale. Activating link 334 enables a user to purchase merchandise such as soundtracks, DVDs, CDs, tickets, apparel or other novelty and/or promotional items related to the production information displayed on the Affiliated Website.

Figure 4:
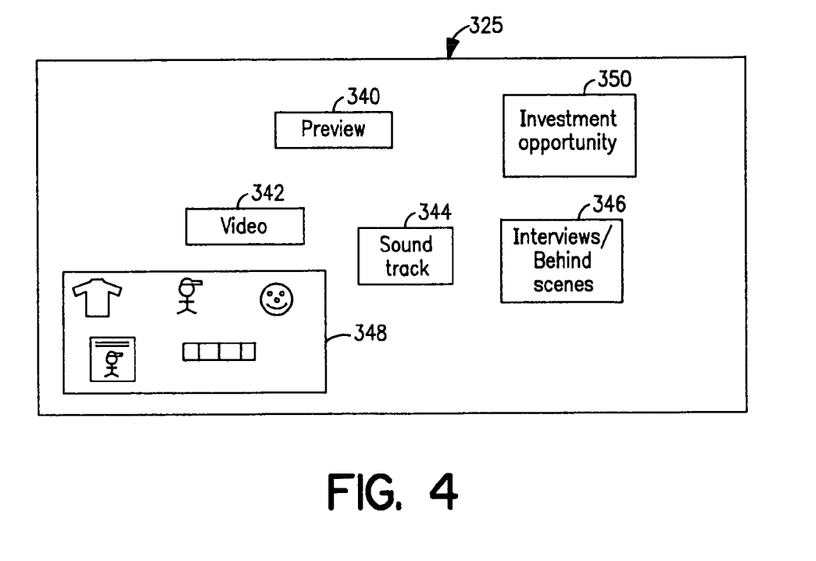
FIG. 4 shows web page content of a Participating Entertainment Company web site.

FIG. 4 shows a view of an exemplary Participating Entertainment Company web page 325, which can be accessed from one of Participating Entertainment Company servers 120 described above by following a link 324, 326 or 328 to a URL of web page 325. As shown in FIG. 4, web page 325 includes a preview link 340, which when accessed, leads to a page of image data relating to a particular movie production. Link 342 leads to a video feed of previews and movie clips. Accessing link 344 provides soundtrack bits from a movie soundtrack. Link 346 enables a user to view interviews with the stars and behind-the-scenes production footage and information. Link 348 links to entertainment-related e-commerce opportunities being offered by the studio, such as the sale of DVDs, tickets, videocassettes, CDs, licensed merchandise and other entertainment related products. It should be understood that the foregoing description of web page 325 is only exemplary, and numerous variations, additions and modifications can be made according to preference.

Upon selecting a particular Participation Trust Unit offered among links 310 in FIG. 3, the user is routed to a web page 60 (FIG. 5) whose data originates from server 116. Web page 60 contains prospectus information concerning the Participation Trust Unit, which the user, in this case, reads by scrolling through. Alternatively, web page 60 can provide for this information to be downloaded to the user, printed at the web site, or mailed or otherwise physically sent to the user, as deemed desirable. A link 350 to the URL of web page 60 (FIG. 4) may also be on Participating Entertainment Company web page 325, as well as the Affiliated Website. The prospectus information 664 includes information and disclosure of risk factors relating to the Participation Trust.

Figure 5:
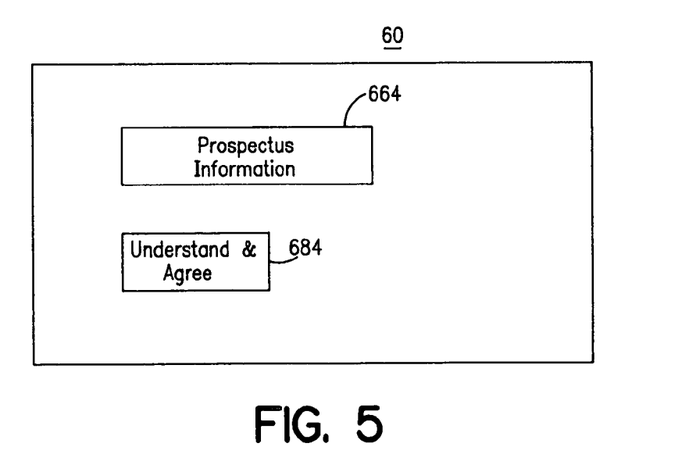
FIG. 5 shows web page content displaying prospectus information.

As shown in FIG. 5, web page 60 is provided prior to a user being permitted to purchase Participation Trust Units. Area 684 is a clickwrap agreement that a user must assent to, indicating that they have read and understand the information provided in the prospectus.

Figure 6:
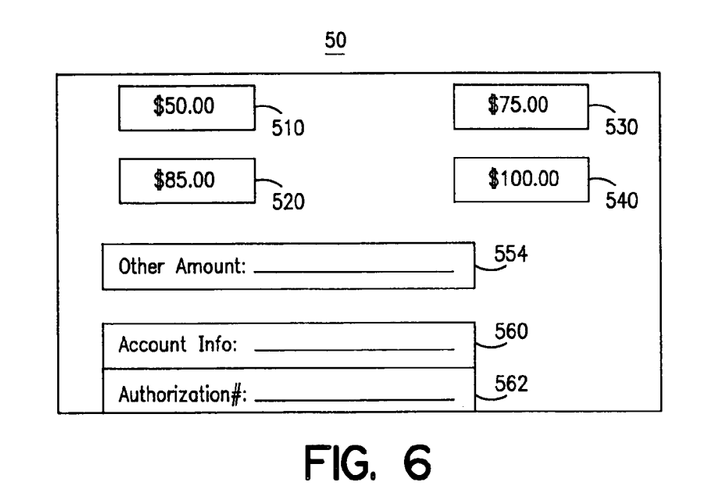
FIG. 6 shows web page content for a user to purchase a selected Participation Trust Unit.

FIG. 6 shows web page 50, displayed from the server 116 after the user has clicked in area 684 on web page 60. In this example, web page 50 has various pre-selected purchase amounts for a user to select, shown as blocks 510, 520, 530 and 540, respectively, by appropriate use of an information appliance. (The amounts shown are merely illustrative and one skilled in the art would readily recognize that other amounts could be used.) In general, it is preferred for Participation Trust Units to be sold in denominations from US$5 to US$500, and more particularly US$50 to US$100. Additionally, block 554 enables a user to input a desired amount that is not listed on the pre-selected amounts described above. This amount may be in excess of a certain minimum threshold that can be predetermined by the Operating Entity. In addition, the amount can be limited to a maximum, or limited to multiples of a certain amount, so that the user purchases are integer numbers of Participation Trust Units. The purchase price of each Participation Trust Unit optionally can be varied on a daily, hourly or other periodic basis depending upon market considerations.

Block 560 is an account information input section that enables a purchaser to input a payment method, such as a credit card number, or a bank account number. This information is transmitted from web page 50 to billing appliance 160 described above. Suitable encryption techniques can be used to ensure the security of the information being transmitted. Block 562 can also optionally be used to permit a user to input an authorization number to be used subsequently by the purchaser to view confidential information regarding his/her purchase. The authorization number is also generally used to limit access to certain portions of the transaction web site. Web page 50 will not be displayed to a user unless the user has agreed to the terms of the prospectus web page shown in FIG. 5.

Figure 7:
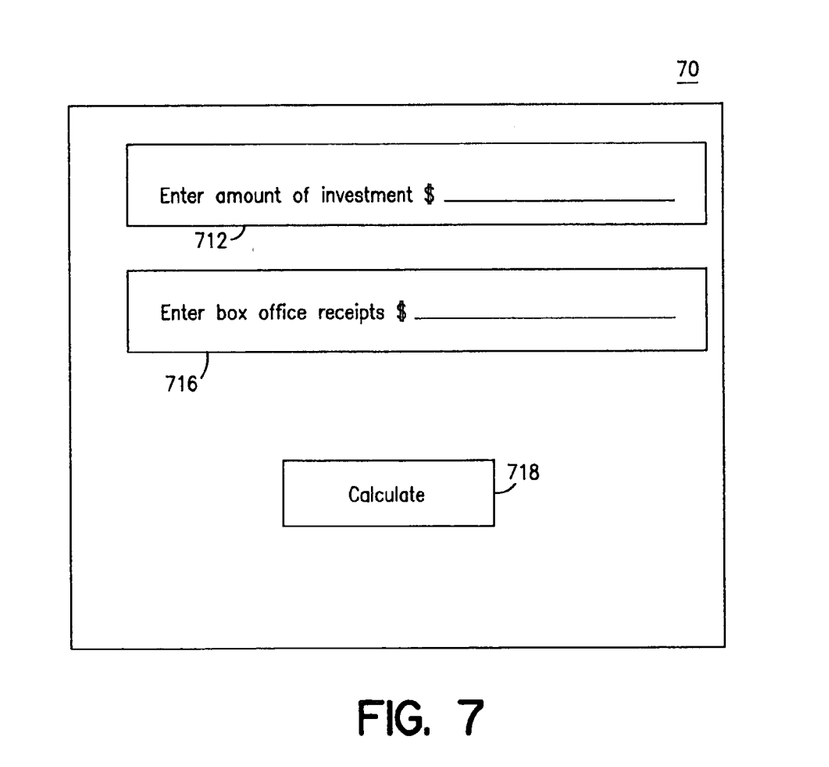
FIG. 7 is web page content that displays the anticipated performance of an Entertainment Production.

As explained above, the payment schedule for each Participation Trust Unit is preferably posted on the Website to enable prospective purchasers to determine, prior to purchase, the return for a given level of box office gross receipts for the Output Film underlying any particular Participation Trust. Alternatively, the user can be provided web page content 70, shown in FIG. 7, which permits a prospective purchaser to determine how much a given Participation Trust Unit will return at various levels of performance. This web page 70 can be made available to prospective purchasers from, for example, web page 60. As shown in FIG. 7, the prospective purchaser enters the amount he/she will be purchasing in block 712, as well as the anticipated box office gross receipts, shown in block 716. The prospective purchaser then hits the "calculate"-button 718, and the web site displays the return on the investment for the return formula then being offered.

Figure 8:
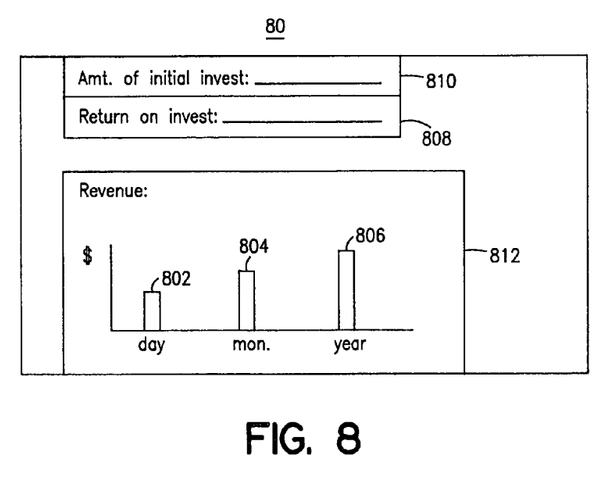
FIG. 8 is web page content that displays the actual performance of an Entertainment Production.

After release of the Entertainment Production associated with a Participation Trust Unit, a purchaser can access a web page 80, as shown in FIG. 8, which displays the purchaser's return to date. This web page optionally can be made available only to persons who are able to provide a valid authorization number (block 562 in FIG. 6). Web page 80 provides a return to date area 808 that can provide an amount that the purchaser has gained, or lost, depending on the performance (such as box office gross receipts) of a particular production. Area 810 shows the actual investment of the particular purchaser. Chart 812 shows the performance generated in dollars for particular periods. In this example, area 802 is a graph showing the performance for a particular production in dollars on a particular day. Area 804 shows a graph of the performance for the particular production for the preceding month. Area 806 shows a graph of the performance for the particular production for the past year.

The return to the Holder of a purchased Participation Trust Unit can be, for example, calculated as a function of a varying, fixed, or sliding scale percentage of the box office gross receipts of the related Entertainment Production, or a certain fixed rate of return, or any other suitable formula. Preferably, in the case where the Participation Trust Units are offered by the Operating Entity, the payment to a Holder of a Participation Trust Unit by the Operating Entity is in proportion to the payments made to the Operating Entity under the Mirror Contractual Interest, which in turn is preferably proportional to the Participation Payout to the Financing Entity from the Participating Entertainment Company for the corresponding Contractual Interest. Likewise, in the alternative embodiment, where the Participation Trust Units are offered by the Financing Entity, the payment to a Holder preferably is in proportion to the Participation Payout to the Financing Entity from the Financing Entity from the Participating Entertainment Company for the corresponding Contractual Interest. In either case, the price of the Participation Trust Units may include a margin over cost to cover overhead, interest and a reserve for inventory losses.

Although FIGS. 3–7 show one example of how the present invention may be implemented in web pages, other alternative formats, visual layouts and designs are equally suitable, as preference dictates, and can be readily implemented by one of ordinary skill in the art without departing from the scope of this invention.

13. System Operation

Figure 9:
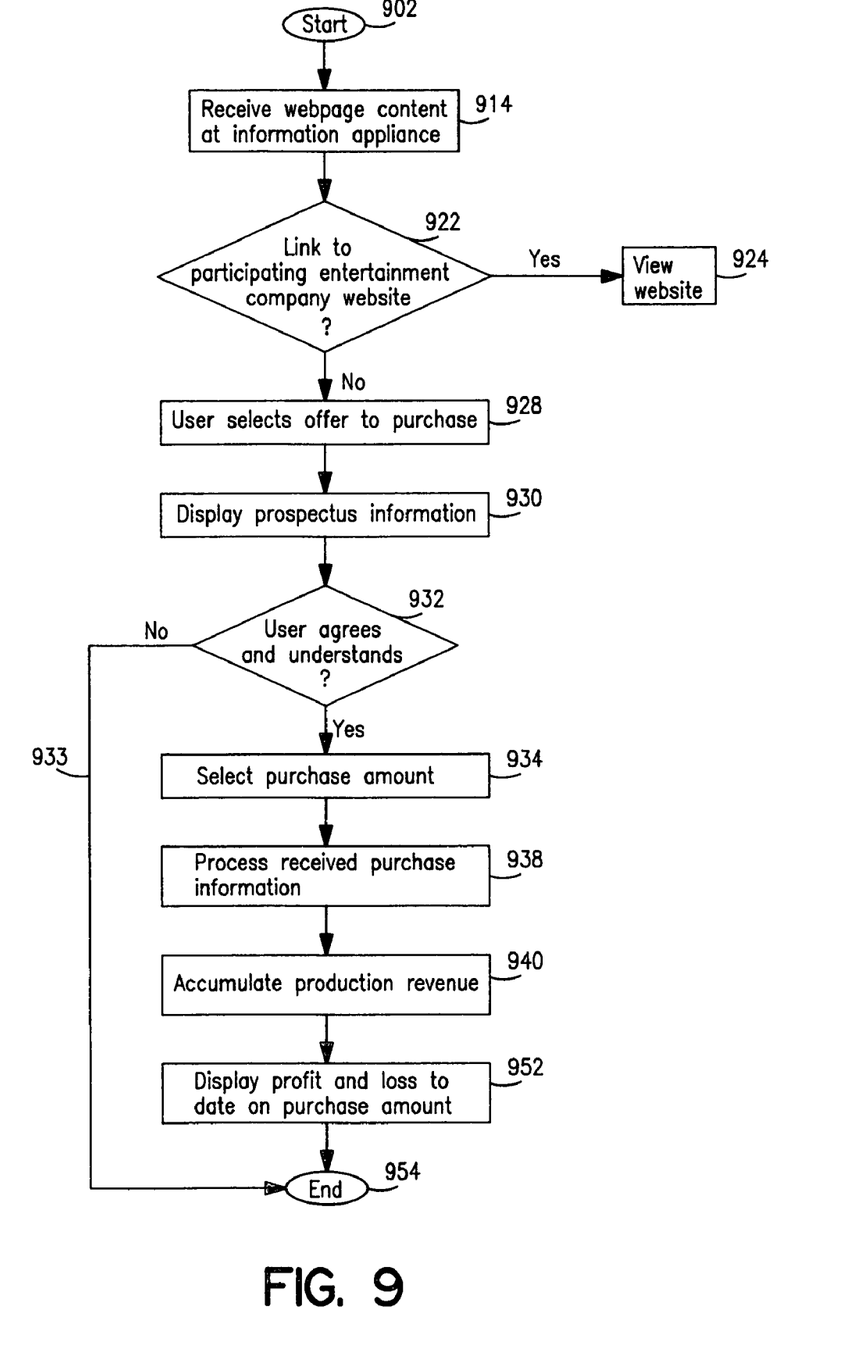
FIG. 9 shows a flowchart of steps of an embodiment of the present invention.

FIG. 9 is a flow chart 90 of steps used to implement the present invention for the purchase of Participation Trust Units. As will be apparent to those of ordinary skill in the art, the steps may be used to purchase Participation Trust Units in movies, television shows, theatrical productions, or other Entertainment Productions.

As shown in FIG. 9, block 902 is a start block that initiates the process.

Block 914 shows that web page content 30 is received by a user at a client information appliance 102. Decision block 922 shows that a user may hyperlink (324, 326 and 328 in FIG. 3) to particular Participating Entertainment Company web sites to get further information about Entertainment Productions, subject to applicable securities laws, such as U.S. Federal and State securities laws. Block 924 shows that a Participating Entertainment Company site can be reached by hyperlinking to it. The hyperlinks are typically embedded in HTML language and are used to enable a user to gather more information from the particular Participating Entertainment Company about a particular Entertainment Production.

Block 928 shows that a user selects from the web site 30 a Participation Trust Unit for possible purchase (310 in FIG. 3). Block 930 shows that prospectus information is displayed on web page 60. In decision block 932, if the user does not agree to the terms, they are not permitted to purchase and line 933 leads to end block 954. If the user assents to the terms of the prospectus then they will be permitted to access a purchase web page. Block 934 shows that a user may select a purchase amount.

Block 938 shows that the data transmitted from the user is processed to ensure the user has an authorized account or credit card number and that the funds can be collected.

After release of the selected Entertainment Production associated with the purchased Participation Trust Unit, block 940 shows that the revenue for each Entertainment Production is received at transaction server 116. Block 952 shows that the return for a purchase amount is displayed for released productions on web page 80. In this embodiment, this display web page may be accessed only by those who have previously purchased Participation Trust Units, although as an alternative non-purchasers can also be permitted to review this information. Block 954 is an end block showing that the process terminates.

The method and system of this invention are widely applicable to movies, network television productions, shows, theatrical performances, and other entertainment productions requiring relatively large amounts of capital to produce, as previously described. Also, it should be noted that while the Financing Entity and Operating Entity are in the preferred embodiment separate organizations, alternatively their activities can be undertaken by a single organization, which would receive the Contractual Interests, establish the Participation Trusts, and sell the Participation Trust Units. In such a case, the Mirror Contractual Interests could be dispensed with. In general, the present invention has been described above in detail by way of examples and illustrations for purposes of clarity of understanding, and not to in any way limit the scope of what is claimed. Those skilled in the art will understand that certain changes and modifications may be made to the spirit of the above without departing from the spirit of the invention.

What is claimed is:

1. A method implemented by a programmed computer system for entertainment production financing comprising:
   a) arranging a first contractual relationship between a first entertainment company and a financing entity, wherein at least a first entertainment production is associated with the first entertainment company and wherein the entertainment company provides a contractual interest to the financing entity in the first entertainment production;
   b) identifying a first fixed cash payment and a first contingent amount;
   c) calculating the first fixed cash payment;
   d) calculating on a computer the first contingent amount;
   e) settling the first fixed cash payment from the financing entity to the first entertainment company;
   f) settling the first contingent amount from the first entertainment company to the financing entity;
   g) arranging a second contractual relationship between a second entertainment company and the financing entity, wherein at least a second entertainment production is associated with the second entertainment company and wherein the entertainment company provides a contractual interest to the financing entity in the second entertainment production;
   h) identifying a second fixed cash payment and a second contingent amount;
   i) calculating the second fixed cash payment;
   j) calculating on a computer the second contingent amount;
   k) settling the second fixed cash payment from the financing entity to the second entertainment company;
   l) settling the second contingent amount from the second entertainment company to the financing entity;
   m) establishing an operating entity that is associated with the financing entity to securitize the contractual interest of the financing entity;
   n) issuing a first registered fixed-price interest by the operating entity, wherein the first registered fixed-price interest is associated with the contractual interest in the first entertainment production;
   o) issuing a second registered fixed-price interest by the operating entity, wherein the second registered fixed-price interest is associated with the contractual interest in the second entertainment production;
   p) transmitting from at least a first computer for a display of an offer to purchase a first registered fixed-price interest to a holder;
   q) receiving on at least the first computer the display of the offer to purchase the first registered fixed-price interest;
   r) selecting on at least the first computer the offer to purchase the first registered fixed-price interest;
   s) indicating on at least the first computer an acceptance of the offer to purchase the first registered fixed-price interest;
   t) transmitting from at least a second computer for a display of an offer to purchase a second registered fixed-price interest to a holder;
   u) receiving on at least the second computer the display of the offer to purchase the second registered fixed-price interest;
   v) selecting on at least the second computer the offer to purchase the second registered fixed-price interest;
   w) indicating on at least the second computer an acceptance of the offer to purchase the second registered fixed-price interest.

2. A method implemented by a programmed computer system for entertainment production financing comprising:
   a) arranging a contractual relationship between at least two entertainment companies and a financing entity, wherein at least two entertainment productions are associated with each entertainment company; wherein each entertainment company provides a contractual interest to the financing entity in the at least two entertainment productions that are associated with each entertainment company; wherein the contractual interest is based at least in part on a performance of the corresponding entertainment productions; and wherein the financing entity securitizes at least a portion of the contractual interest;
   b) identifying a fixed cash payment and a contingent amount;
   c) calculating the fixed cash payment;

d) calculating on a computer the contingent amount based on a payout schedule of the at least two entertainment productions;
e) settling the fixed cash payment from the financing entity to the entertainment company;
f) settling the contingent amount from the entertainment company to the financing entity;
g) issuing a registered fixed-price interest by the operating entity, wherein the registered fixed-price interest is associated with the contractual interest in the entertainment production;
i) transmitting from a computer for a display of an offer to purchase a registered fixed-price interest to a holder;
j) receiving on the computer the display of the offer to purchase the registered fixed-price interest;
k) selecting on the computer the offer to purchase the registered fixed-price interest; and
l) indicating on the computer an acceptance of the offer to purchase the registered fixed-price interest.

3. The method of claim 2 wherein the payout schedule is determined by a reference to a relationship between a production cost of a motion picture and box office gross receipts generated by the motion picture.

4. The method of claim 1 wherein the first contingent amount is based on a payout schedule of at least a portion of the first entertainment production and the second contingent amount is based on a payout schedule of at least a portion of the second entertainment production.

* * * * *